United States Patent
Yamakawa et al.

(10) Patent No.: US 7,842,331 B2
(45) Date of Patent: Nov. 30, 2010

(54) MANUFACTURING METHOD AND EVALUATING METHOD OF MAGNETIC RECORDING MEDIUM

(75) Inventors: Eishin Yamakawa, Higashine (JP); Makoto Okada, Higashine (JP); Jun Fujii, Higashine (JP); Takako Yamauchi, Higashine (JP)

(73) Assignee: Showa Denko K.K., Tokyo (JP)

( * ) Notice: Subject to any disclaimer, the term of this patent is extended or adjusted under 35 U.S.C. 154(b) by 762 days.

(21) Appl. No.: 11/892,217

(22) Filed: Aug. 21, 2007

(65) Prior Publication Data
US 2009/0053394 A1 Feb. 26, 2009

(30) Foreign Application Priority Data
Dec. 1, 2006 (JP) .............................. 2006-326176

(51) Int. Cl.
*B05D 3/00* (2006.01)
(52) U.S. Cl. .............................. 427/8; 73/10; 428/833.6
(58) Field of Classification Search ...................... 427/8, 427/9, 127, 10; 73/10; 428/833.6, 835.7, 428/835.8
See application file for complete search history.

(56) References Cited

U.S. PATENT DOCUMENTS 6,249,403 B1 * 6/2001 Tokisue et al. ............ 360/235.2
6,518,572 B1 * 2/2003 Kishii et al. ............... 250/339.08
2003/0157374 A1 * 8/2003 Kato et al. ............... 428/694 TC

FOREIGN PATENT DOCUMENTS

JP 62-167618 7/1987

* cited by examiner

*Primary Examiner*—Michael Cleveland
*Assistant Examiner*—Tabassom Tadayyon Eslami
(74) *Attorney, Agent, or Firm*—Kratz, Quintos & Hanson, LLP

(57) ABSTRACT

A manufacturing method of a magnetic recording medium having a surface where a lubricating layer is provided, the manufacturing method includes the steps of: applying a lubricant so that the lubricating layer is formed; and inspecting the magnetic recording medium where the lubricating layer is formed; wherein the step of inspecting includes a first step of floating a magnetic head over the magnetic recording medium or sliding the magnetic head on a surface of the magnetic recording medium; a second step of adhering a medium facing surface of the magnetic head to a surface of a substrate for measuring, standing the medium facing surface of the magnetic head on the surface of the substrate for measuring, and transferring the lubricant from the medium facing surface of the magnetic head to the substrate for measuring; a third step of measuring an amount of the lubricant on the surface of the substrate for measuring; and a fourth step of determining whether the amount of the lubricant is proper.

9 Claims, 9 Drawing Sheets

10

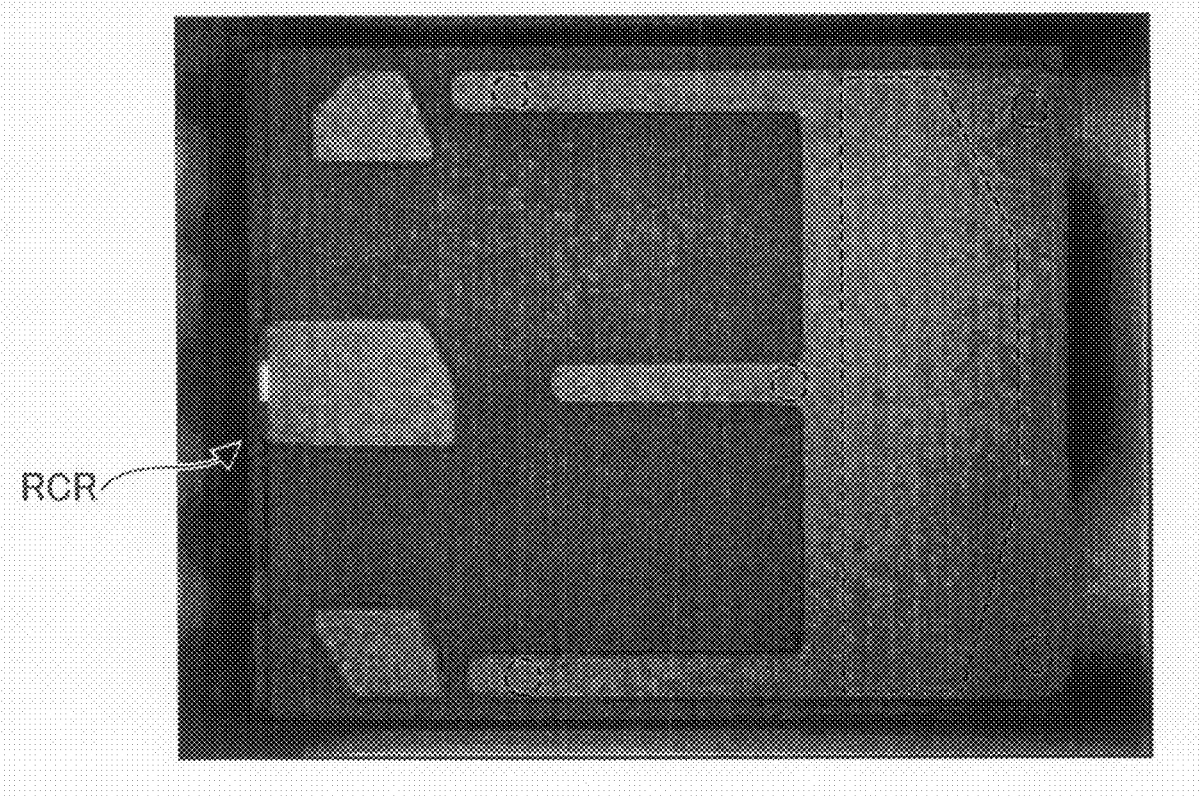

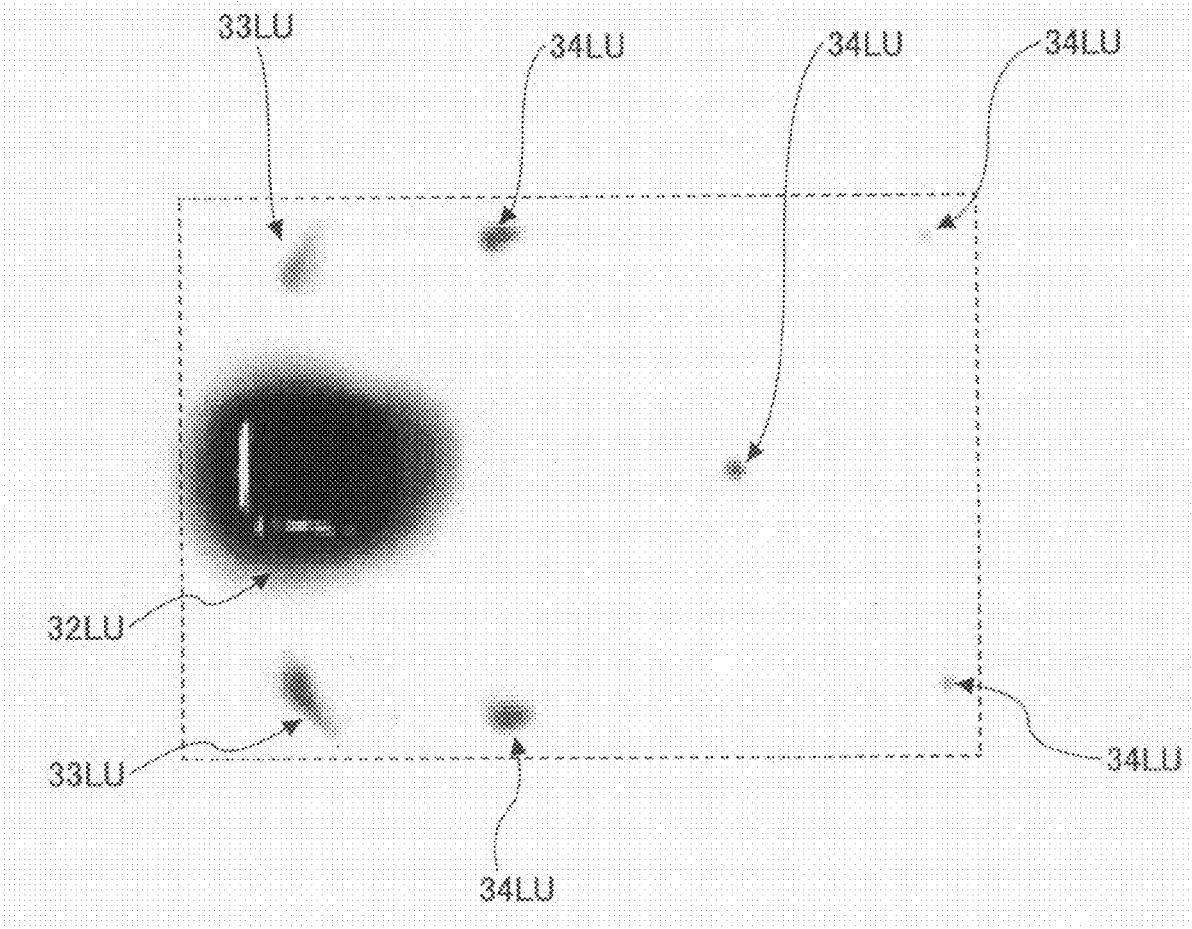

32LU

32LU

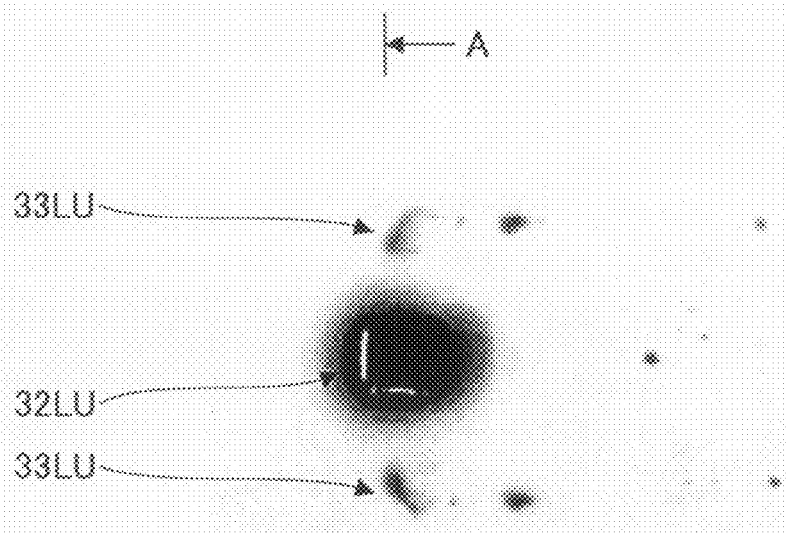

MANUFACTURING METHOD AND EVALUATING METHOD OF MAGNETIC RECORDING MEDIUM

BACKGROUND OF THE INVENTION

1. Field of the Invention

The present invention generally relates to manufacturing methods and evaluating methods of magnetic recording media, and more specifically, to a manufacturing method and evaluating method of a magnetic recording medium having a lubricating layer.

2. Description of the Related Art

In recent years, a magnetic storage device such as a magnetic disk device has been and being used in a wide range as a storage device of a motion picture or music. Especially, the magnetic storage device is used for recording motion pictures for home use. The magnetic storage device has a high speed access, a small size, and a large capacity and therefore the market size of the magnetic storage device is increasing instead of a conventional video device for home use using a video tape. Since the amount of information of the motion picture is large, it is required for the magnetic disk device to have a large capacity. Because of this, in order to further improve recording density that is increasing at 100% per year, improvement of technology for higher recording density of a magnetic head and a magnetic disk is required.

As a method for achieving the high recoding density, making the floating height of the magnetic head low is progressing. The floating height is the minimum distance between the medium facing surface of a head slider of the magnetic head and the magnetic disk surface. By reducing the floating height, it is possible to make the distance between a recording element and a regeneration element of the magnetic head and a recording layer of the magnetic disk small. As a result of this, a recording magnetic field having greater strength can be applied to a recording layer and a signal magnetic field from the recording layer can be detected in a stronger state.

A protection film or a lubricating layer is formed on the surface of the magnetic disk so as to cover the recording layer. The protection film or the lubricating layer prevents damage of the recording layer from undesirable impacts by the magnetic head.

In order to inspect for mechanical strength of the protection film, evenness of film thickness of the lubricating layer, or securing stability of the lubricating layer or the protection film, there is a CSS (Contact Start and Stop) test, a load and unload test wherein the magnetic disk is rotated so that loading and unloading of the magnetic head is repeated, a seek test wherein moving (seeking of) the magnetic head is repeated between the internal circumference and the external circumference of the magnetic disk, and an accelerating test for implementing these tests in an atmosphere of high temperature and high humidity.

Through these test, quality of the magnetic disk is determined by checking for existence of damage of the disk surface or dirt on the medium facing surface of the magnetic head. Optical microscopes have been used for seeing the dirt of the medium facing surface of the magnetic head. See, for example, Japanese Laid-Open Patent Application Publication No. 62-167618.

In the meantime, since a frictional wear powder of the protection film adhered to the medium facing surface of the magnetic head looks like a black lump through the optical microscope, it is possible to easily see it.

However, it is difficult to see a liquid state hyaline lubricant through the optical microscope. Therefore, even if a large amount of the lubricant is adhered, it is difficult to make proper determination. The adherence of the lubricant on the medium facing surface influences the floating stability of the magnetic head. The more the floating height is reduced, the greater the degree of the influence becomes.

As a method for evaluating the amount of the lubricant, there is an ESCA (X ray electron spectroscopy) method or an FTIR (Fourier transform infrared spectroscopy) method. However, these methods are evaluating methods of the magnetic disk. Although it is possible to directly see the amount of adhesion of the lubricant on the medium facing surface by the ESCA (X ray electron spectroscopy) method or the FTIR (Fourier transform infrared spectroscopy) method, a concave and convex part such as a pad or groove is formed on the medium facing surface and therefore the medium facing surface is not flat. Hence, focusing should be done frequently and therefore measurement of the amount of lubricant is complex and difficult. In addition, measurement of the distribution of the amount of the lubricant adhered on the medium facing surface is extremely difficult.

SUMMARY OF THE INVENTION

Accordingly, embodiments of the present invention may provide a novel and useful manufacturing method and evaluating method of a magnetic recording medium solving one or more of the problems discussed above.

More specifically, the embodiments of the present invention may provide a manufacturing method and evaluating method of a magnetic recording medium whereby it is possible to easily and securely evaluate qualities of a lubricating layer of a magnetic recording medium by using a magnetic head.

One aspect of the present invention may be to provide a manufacturing method of a magnetic recording medium having a surface where a lubricating layer is provided, the manufacturing method including the steps of applying a lubricant so that the lubricating layer is formed; and inspecting the magnetic recording medium where the lubricating layer is formed; wherein the step of inspecting includes a first step of floating a magnetic head over the magnetic recording medium or sliding the magnetic head on a surface of the magnetic recording medium; a second step of adhering a medium facing surface of the magnetic head to a surface of a substrate for measuring, standing the medium facing surface of the magnetic head on the surface of the substrate for measuring, and transferring the lubricant from the medium facing surface of the magnetic head to the substrate for measuring; a third step of measuring an amount of the lubricant on the surface of the substrate for measuring; and a fourth step of determining whether the amount of the lubricant is proper.

Another aspect of the present invention may be to provide an evaluating method of a magnetic recording medium, including the step of: a first step of floating a magnetic head over the magnetic recording medium having a surface where a lubricating layer is formed or sliding the magnetic head on the surface of the magnetic recording medium; a second step of contacting a medium facing surface of the magnetic head to a surface of a substrate for measuring, standing the medium facing surface of the magnetic head on the surface of the substrate for measuring, and transferring a lubricant from the medium facing surface of the magnetic head to the substrate for measuring; a third step of measuring an amount of the lubricant on the surface of the substrate for measuring; and a fourth step of determining whether the amount of the lubricant is proper.

According to the embodiments of the present invention, it is possible to provide a manufacturing method and evaluating method of a magnetic recording medium whereby it is possible to easily and securely evaluate qualities of a lubricating layer of a magnetic recording medium by using a magnetic head.

Other objects, features, and advantages of the present invention will be come more apparent from the following detailed description when read in conjunction with the accompanying drawings.

BRIEF DESCRIPTION OF THE DRAWINGS

FIG. 4B is an optical microscope picture of the medium facing surface of the magnetic head after a magnetic disk scanning process;

FIG. 4C is a view showing distribution of a lubricant amount on a substrate for measuring after the transferring process;

FIG. 7A is a view showing distribution of the lubricant amount on the substrate for measuring, where a transferring process of a second example is applied; and FIG. 7B is a graph showing distribution of the lubricant amount at line A-A in FIG. 7A.

DETAILED DESCRIPTION OF THE PREFERRED EMBODIMENTS

A description is given below, with reference to the FIG. 1 through FIG. 7B of embodiments of the present invention.

Figure 1:
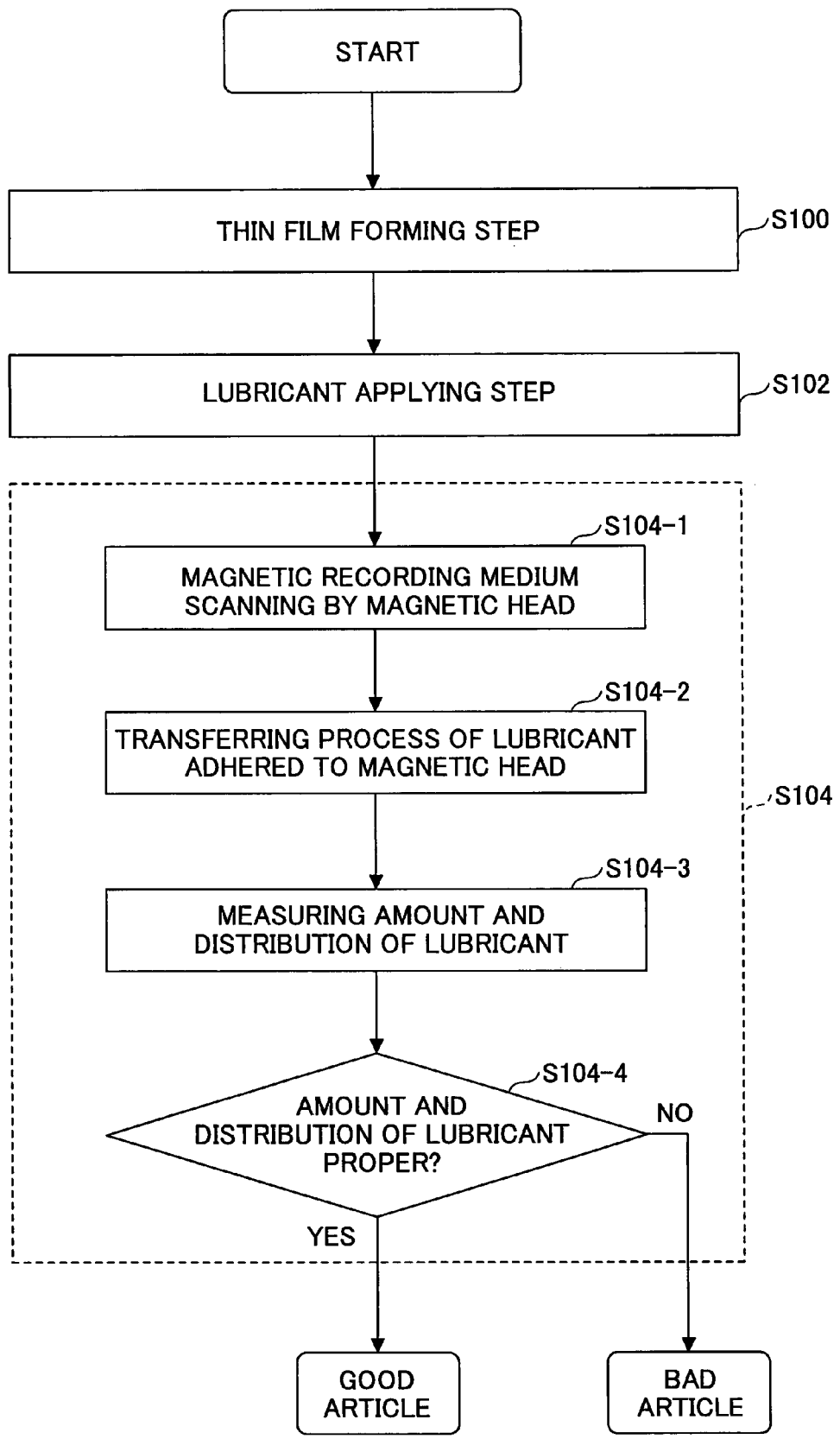
FIG. 1 is a flowchart of a manufacturing method of a magnetic recording medium of an embodiment of the present invention.
Figure 2:
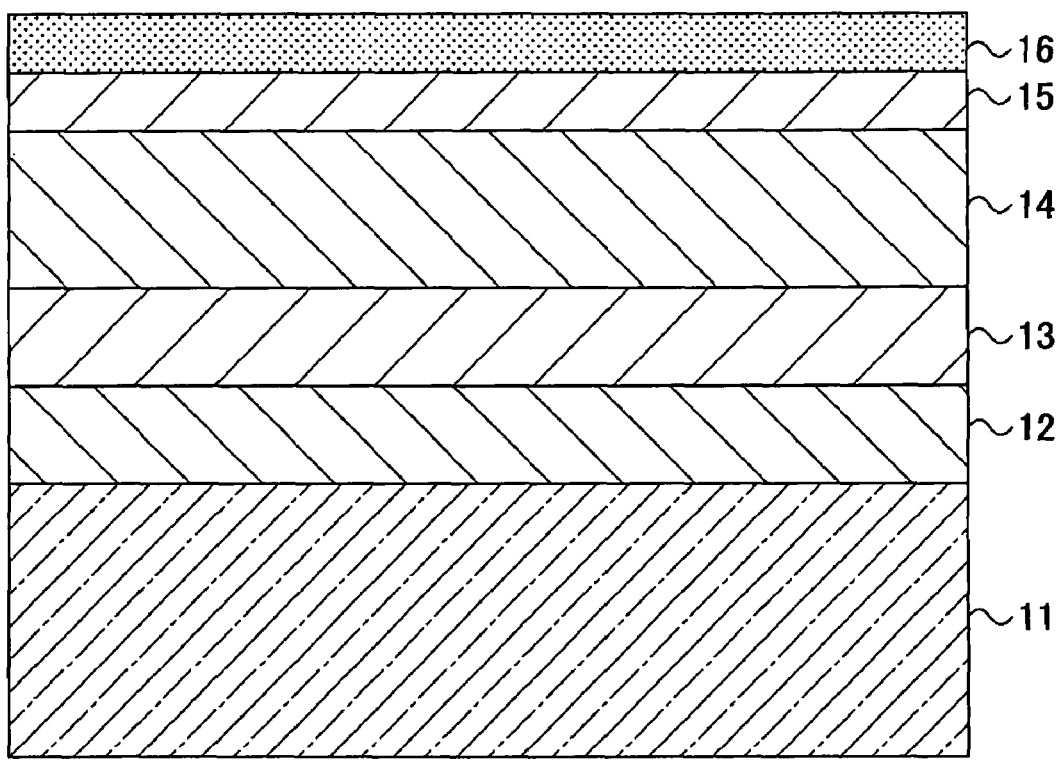
FIG. 2 is a cross-sectional view of the magnetic recording medium.

The manufacturing method of the magnetic recording medium of the embodiment of the present invention is discussed with reference or FIG. 1 and FIG. 2. Here, FIG. 1 is a flowchart of a manufacturing method of a magnetic recording medium of an embodiment of the present invention. FIG. 2 is a cross-sectional view of the magnetic recording medium.

The manufacturing method of the magnetic recording medium of the embodiment of the present invention includes a thin film forming step (S100), a lubricant applying step (S102), and an inspection step (S104).

In the thin film forming step (S100), a seed layer 12, a primary layer 13, a recording layer 14 and a protection film 15 are formed on a substrate 11 in order. In the lubricant applying step (S102), a lubricant is applied on the surface of the protection film 15 so that the lubricant layer 16 is formed. In the inspection step (S104), properties of the lubricant layer 16 are inspected.

In the thin film forming step (S100), the substrate 11 is cleaned, heated at a designated temperature in a vacuum chamber, and dried. In addition, through a thin film forming method such as a sputtering method (for example, DC magnetron sputtering), the seed layer 12, the primary layer 13, the recording layer 14 and the protection film 15 are deposited on the substrate 11 in order by using sputtering targets of each of the materials of the seed layer 12, the primary layer 13, the recording layer 14 and the protection film 15.

In this embodiment, there is no limitation of a structure of the magnetic recoding medium 10 other than the lubricating layer 16 formed on the surface of the magnetic recording medium 10. In other words, the magnetic recording medium 10 may be an in-plane magnetic recording medium where an easy axis of magnetization of the recording layer 14 is parallel with a film surface, a vertical magnetic recording medium where the easy axis of magnetization of the recording layer 14 is vertical to the film surface, a vertical magnetic recording medium where the easy axis of magnetization of the recording layer 14 is vertical to the film surface, or an oblique orientation magnetic recording medium where the easy axis of magnetization of the recording layer 14 is oblique to the film surface.

A manufacturing method of the in-plane magnetic recording medium is discussed below as an example.

First, the seed layer 12 is formed on the substrate 11. The seed layer 12 is composed of, for example, metal, an alloy or an intermetallic compound of a crystalline material. It is preferable that a material for the seed 12 is selected from an alloy, having a B2 crystal structure such as AlRu or NiAl, so that crystallinity and crystalline orientation of the primary layer 13 formed on the seed layer 12 are improved.

The substrate 11 has a disk-shaped configuration. There is no limitation of the substrate 11. The substrate 11 may be made of a glass substrate, an NiP plating aluminum alloy substrate, a silicon substrate, a plastic substrate, a ceramics substrate, a carbon substrate, or the like.

Before the seed layer 12 is formed, a texture (not shown in FIG. 2) such as a mechanical texture, made of a large number of grooves, may be formed along a circumferential direction. Because of the texture, it is possible to improve orientation in the circumferential direction of the easy axis of magnetization of the recording layer 14.

Next, the primary layer 13 is formed on the seed layer 12. A material of the primary layer 13 selected from Cr or Cr—X1 alloy having a bcc crystal structure. Here, "X1" is selected from Mo, W, V, B, and these alloys. By using the Cr—X1 alloy as the primary layer 13, lattice matching of the recording layer 14 is improved so that crystalline orientation and crystallinity of crystalline can be improved.

Next, the recording layer 14 is formed on the primary layer 13. A material of the recording layer 14 is selected from a group of ferromagnetic materials such as Co, Ni, Fe, Co group alloy, Ni group alloy, or Fe group alloy. The recording layer has thickness equal to 0.5 nm or more and equal to 20 nm or less. It is preferable that the recording layer 14 be made of CoCr, CoCr group alloy, CoCrTa, CoCrTa group alloy, CoCrPt, or CoCrPt group alloy among Co group alloy.

In addition, a stacked body may be formed as the recording layer 14 not shown in FIG. 2. The stacked body is formed by two magnetic layers made of the above-mentioned ferromagnetic material and a Ru film having thickness of 0.7 nm, for example, and sandwiched by these magnetic layers. In this stacked body, since an antiferromagnetic switched connection of these two magnetic layers is made, it is possible to prevent heat fluctuation wherein remanent magnetization of the recording layer is chronologically reduced without increase of actual magnetization in a volume of a recording unit per one bit information.

Next, the protection film 15 is formed on the recording layer 14. The protection film 15 may be formed by a CVD (Chemical Vapor Deposition) method or a FCA (Filtered Cathode Arc) method, other than a sputtering method. The protection film 15 has thickness equal to 0.5 nm or more and equal to 10 nm or less (preferably a thickness equal to 0.5 nm or more and equal to 5 nm or less). The protection film 15 is made of, for example, diamond-like carbon, nitride carbon, or amorphous carbon.

Next, a lubricant applying step is applied in step S102 so that the lubricant is applied to the surface of the protection film 15 and thereby the lubricating layer 16 is formed. A lubricant, such as an organic group liquid lubricant wherein a backbone is PFPE (perfluoropolyether) and an end group is —OH or phenyl group, is used for the lubricating layer 16. A dipping method is used for the lubricant applying step so that the substrate 11 where the protection film 15 is formed is dipped in a dilute lubricant solution where the organic group liquid lubricant is diluted by a solvent and the substrate 11 is picked up at a designated speed. In this step, instead of the dipping method, a liquid surface decreasing method whereby the liquid surface of the dilute lubricant solution is decreased without changing the position of the substrate 11, a spray method, or spin coating method can be used. Thus, the magnetic recording medium 10 is formed.

In order to improve a fixing ratio of lubricant molecule to the surface of the protection film 15 after the lubricant is applied, a heating process at a heating temperature of, for example, 205° C. may be applied to the magnetic recording medium 10. By the heating process, a transferring amount of lubricant from the magnetic recording medium 10 to the magnetic head can be reduced in a magnetic recording medium scanning process (S104-1) by the magnetic head discussed below.

Next, an inspection step of the magnetic recording medium is implemented in step S104. The inspection step in step S104 includes a magnetic recording medium scanning process in step S104-1, a transferring process in step S104-2, measuring process in step S104-3, and a determining process in step S104-4.

In the magnetic recording medium scanning process in step S104-1, the formed magnetic recording medium 10 is scanned by a magnetic head. In the transferring process in step S104-2, the lubricant adhered to the magnetic head by the magnetic recording medium scanning process in step S104-1 is transferred to the substrate for measuring. In the measuring process in step S104-3, the amount and distribution of the lubricant adhered to the substrate for measuring is measured. In the determining process in step S104-4, whether the obtained amount and distribution of the lubricant are proper is determined.

Next, details of the inspection step are discussed with reference to FIG. 3A through FIG. 3C in addition to FIG. 1 and FIG. 2.

Figure 3A:
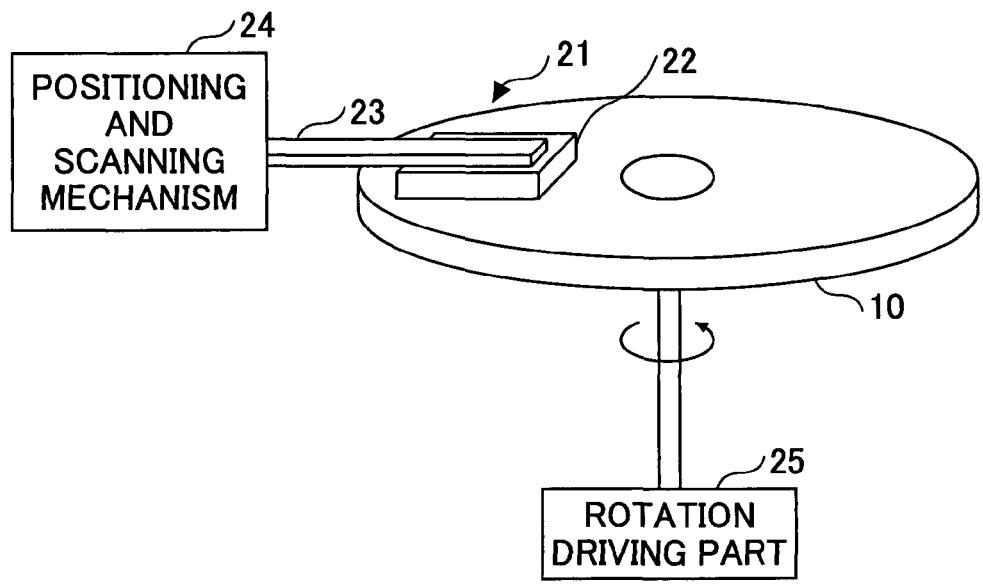
FIG. 3A is a schematic view for explaining a magnetic recording medium scanning process in an inspection step.

FIG. 3A is a schematic view for explaining the magnetic recording medium scanning process in the inspection step.

First, the magnetic recording medium scanning process (step S104-1) wherein the magnetic recording medium is scanned by the magnetic head is implemented. In this process, the magnetic head 21 is floated above the magnetic recording medium 10 or the magnetic head 21 is slid on the surface of the magnetic recording medium 10.

As shown in FIG. 3A, a suspension 23 of the magnetic head 21 is attached to a positioning and scanning mechanism 24. A head slider 22 is floated above or slid on the magnetic recording medium 10 which is an inspection subject rotated by a rotation driving part 25. In this magnetic recording medium scanning process, depending on an object of evaluation of the lubricating layer 16, a CSS (Contact Start and Stop) test, an (H/UL) load and unload test wherein the magnetic recording medium 10 is rotated so that loading and unloading of the magnetic head 21 is repeated, a seek test wherein seeking of the magnetic head 21 is repeated between the internal circumference and the external circumference of the magnetic recording medium 10, or an accelerating test for implementing these tests in an atmosphere of high temperature and high humidity, is implemented. These tests can be implemented by using altered hard disk devices on the market or known testing devices.

Figure 4A:
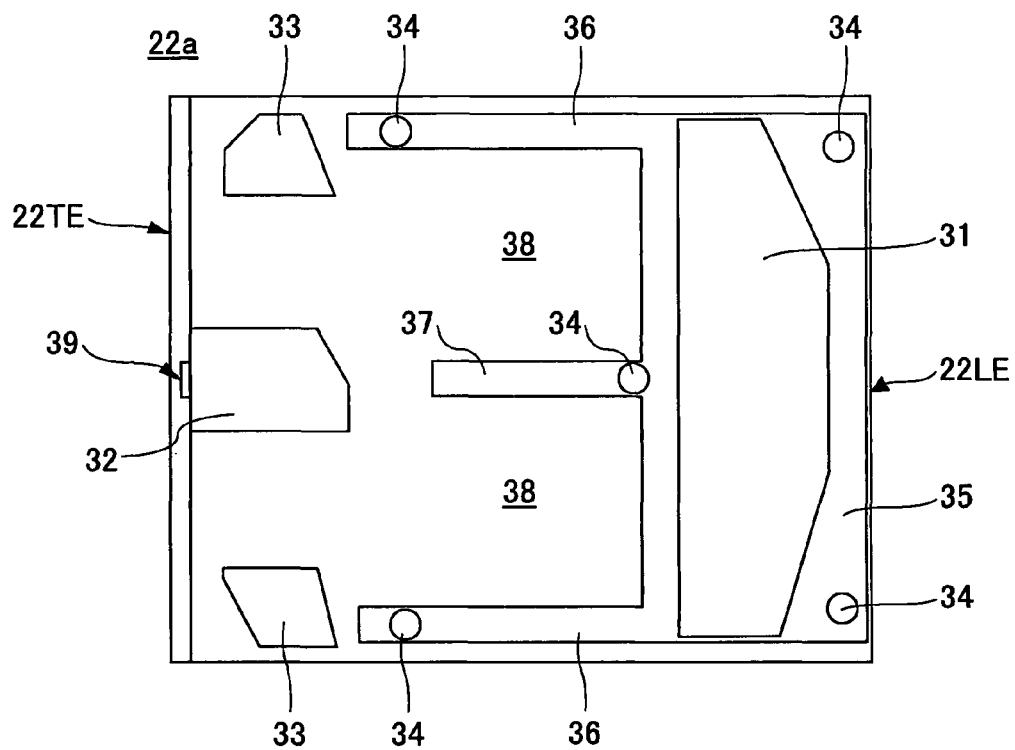
FIG. 4A is a plan view of a medium facing surface of a magnetic head.

FIG. 4A is a plan view of a medium facing surface of a magnetic head. Although the medium facing surface of the magnetic head used in examples discussed below is shown in FIG. 4, the structure of the magnetic head which can be used in the present invention is not limited to this.

Referring to FIG. 4A, on the medium facing surface 22a, as convex parts, a front rail 31 is formed at an air inflow end 22LE side and a rear center rail 32 and rear side rails 33 are formed at an air outflow end 22TE.

An element part 39 is provided at the air inflow end 22TE of the rear center rail 32. The element part 39 is formed by a recording element and a regenerating element.

In addition, pads 34 are formed as part of the convex parts so as to weaken the impact when the medium facing surface 22a comes in contact with the magnetic recording medium surface and prevent adhesion when the medium facing surface 22a comes in contact with and rests on the magnetic recording medium surface.

By the magnetic recording medium scanning process, a lubricant at a part where the lubricating layer 16 of the magnetic recording medium can be easily made to flow or a tab part having a partially thick film thickness is easily adhered to these convex parts and a side surface of the air outflow end 22TE of the convex part.

On the medium facing surface 22a, a front rail step part 35, a side rail 36, and a center rail 37 are formed in a position one step lower than the front rail 31 and a groove forming part 38 is formed in a position further lower than the position of the front rail step part 35, the side rail 36, and the center rail 37.

In a case where the magnetic head 21 is floated due to air inflow between the magnetic head 21 and the surface of the magnetic recording medium 10, the convex parts receive positive pressure in the floating direction. On the other hand, a negative pressure is formed at the groove forming part 38 so that the medium facing surface is pulled toward the magnetic recording medium side. The head slider 22 is floated at a designated floating height by balance of the positive pressure and the negative pressure.

FIG. 4B is an optical microscope picture of the medium facing surface of the magnetic head after a magnetic disk scanning process.

Referring to FIG. 4B, adherence of the lubricant on the medium facing surface 22a is not recognized via the optical microscope picture. In observation by the optical microscope, while the adhesion of the lubricant may be observed in a case where a frictional wear powder of the protection film is mixed, it is not possible to properly and reliably observe the adhered lubricant.

Figure 3B:
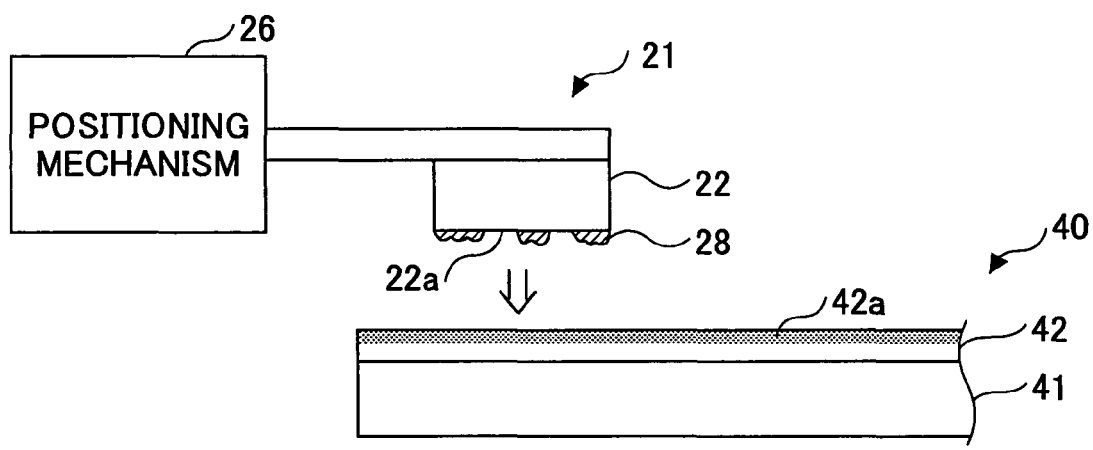
FIG. 3B is a schematic view for explaining a transferring process of a lubricant in the inspection step.

Next, as shown in FIG. 3B, a transferring process is implemented in step S104-2 so that the lubricant 28 adhered to the medium facing surface 22a by the magnetic rerecording medium scanning process is transferred to the substrate 40 for measuring. Here, FIG. 3B is a schematic view for explaining the transferring process of the lubricant in the inspection step.

In the transferring process, the magnetic head 21 used in the magnetic recording medium scanning process is adhered to and stands on the surface of the substrate 40 for measuring. At this time, it is preferable that the medium facing surface 22a be made to uniformly come in contact with the flat surface of the substrate 40 for measuring.

By making the medium facing surface 22a uniformly come in contact with the flat surface of the substrate 40 for measuring, the lubricant is transferred to the substrate 40 for measuring evenly so that the amount of lubricant can be accurately measured.

In the transferring process, more specifically, the magnetic head 21 is attached to a positioning mechanism 26, and the medium facing surface 22a is lowered in the parallel with the surface of the substrate 40 for measuring so as to be adhered to and stand on the surface of the substrate 40 for measuring.

It is preferable that a protection film 42 made of the same material as that of the protection film 15 of the magnetic recording medium 10 shown in FIG. 2 be formed on the surface of the substrate 41 of the substrate 40 for measuring. Because of this, it is possible to smoothly transfer the lubricant.

It is preferable that the substrate 40 for measuring have the structure of the magnetic recording medium 10 shown in FIG. 2 but without the lubricating layer 16.

In addition, in a case where the protection film 42 of the substrate 40 for measuring is made of carbon film, it is preferable that the surface of the protection film 42 be nitrided so that a nitrocarburizing surface 42a is formed. Because of this, since the adhesion of the lubricant to the protection film 42 is improved, it is possible to easily transfer the lubricant. It is most preferable that the amount of nitride on the surface of the protection film 42 is 10 at % through 15 at % of the entirety because the adhesion is improved a lot.

While a time for adhering the magnetic head 21 on the surface of the substrate 40 for measuring and standing is discussed below, 60 minutes or more is preferable.

Even if the time is shorter than 60 minutes, a test of the amount of the lubricant can be implemented. However, if the magnetic head 21 stands for 60 minutes or more, the substantially entire amount of the lubricant 28 adhered on the medium facing surface 22a can be transferred and therefore the amount of the lubricant adhered to the medium facing surface 22a can be reliably measured.

It is preferable that the temperature of the transferring process is in a range of 20° C. through 30° C. If the temperature of the transferring process be less than 20° C., it may be difficult to implement the transferring process. If the temperature of the transferring process is higher than 20° C., flowability of the lubricant is improved and the lubricant after being adhered is easily defused on the substrate for measuring. Therefore, the distribution of the adhered lubricant cannot be accurately measured.

Next, the amount and the distribution of the lubricant adhered on the substrate for measuring is measured in step S104-3.

The measurement of the amount of the lubricant can be done by using the ESCA (X ray electron spectroscopy) method, the FTIR (Fourier transform infrared spectroscopy) method, or the ellipsometry method. Since the surface of the substrate 40 for measuring is flat, it is possible to easily perform the measuring by using any of the above-mentioned methods.

For example, in a case where the ESCA method is used, it is possible to easily to focus on the position where the X rays are irradiated.

In a case of the FTIR, a microscopic FTIR where a microscope and a FTIR device are combined is used. In this case, while focusing on the surface of the substrate 40 for measuring is necessary for measuring the amount of the lubricant, since the substrate 40 for measuring is flat, focusing is easy and easiness when the distribution of the amount of the lubricant is measured is increased.

Figure 3C:
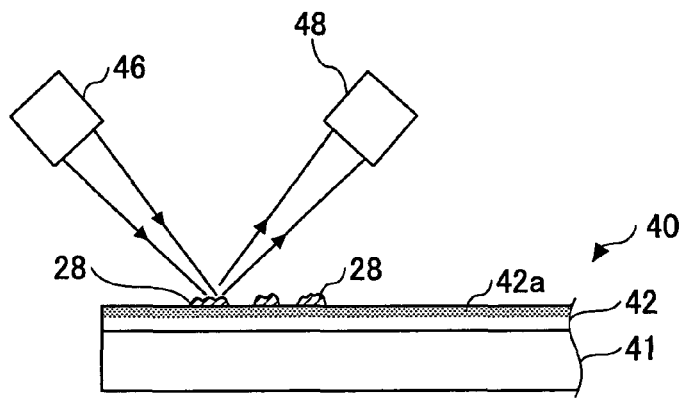
FIG. 3C is a schematic view for explaining the lubricant and distribution measurement in the inspection step.

In addition, as shown in FIG. 3C, in the ellipsometry method, a linearly polarized laser light is irradiated on the lubricant 28 transferred onto the surface of the substrate 40 for measuring by a laser light source 46 so that reflection light is detected by a light deflector 48. Here, FIG. 3C is a schematic view for explaining the lubricant and distribution measurement in the inspection step.

The film thickness of the lubricant is measured by phase difference and reflection strength ratio of a P wave and an S wave of the reflection light, or by the reflection strength ratio of the P wave and the S wave of the reflection light and reflection strength of a P wave and an S wave of scattered light.

Furthermore, by scanning the laser light, it is possible to measure the distribution of the film thickness of the lubricant that is distribution of the amount of the lubricant. As a measuring device used for the ellipsometry method, for example, "OSA 6100" manufactured by Candela (United States of America) can be used.

FIG. 4C is a view showing distribution, by using the above-mentioned "OSA 6100", of a lubricant amount on a substrate for measuring after the transferring process.

In FIG. 4C, a part having a larger amount of the lubricant is indicated with a darker density. In FIG. 4C, the external configuration of the medium facing surface 22a contacting the substrate for measuring is indicated by a dotted line. Larger and smaller amounts of the distribution of the lubricant are opposite to (match) the medium facing surface 22a indicated in FIG. 4A and FIG. 4B.

As shown in FIG. 4C, the amounts of the lubricant of parts indicated by 32LU and 33LU are large. The rear center rail 32 and the rear side rail 33 shown in FIG. 4A come in contact with these parts. In addition, the amounts of the lubricant at parts indicated by 34LU, namely parts coming in contact with the pad 34, are large.

Thus, it is found that a large mount of the lubricant are adhered to the rear center rail 32, the rear side rail 33, and the pads 34 of the magnetic head by the magnetic recording medium scanning process. On the other hand, in the optical microscope picture shown in FIG. 4B, adhesion of the lubricant to the rear center rail 32 and the rear side rail 33 is not found. Hence, there is advantage in the transferring process and the measuring of the amount of the lubricant. The amount of lubricant adhered to the magnetic head can be determined from the distribution shown in FIG. 4C.

Next, it is determined in step S104-4 whether the obtained lubricant amount or lubricant distribution is proper. A threshold value of whether the obtained lubricant amount or lubricant distribution is proper may be properly determined. For example, the threshold value is determined as corresponding to the CSS test, H/UL test, the seek test, or the like.

It is normally preferable that the amount of the lubricant be smaller. "The film thickness of the maximum lubricant is substantially the same as or smaller than the designated value" may be an example for determining whether the lubricant amount or lubricant distribution is proper.

If the lubricant amount or lubricant distribution is proper (YES in step S104-4), it is determined that the magnetic recording medium which is the inspection subject is a good article and therefore the process goes to another inspection step not shown or the magnetic recording medium may be provided in the magnetic storage apparatus.

If the lubricant amount or lubricant distribution is not proper (NO in step S104-4), it is determined that the magnetic recording medium is a bad article and therefore a regeneration process such as a disposal process, a thermal process, or a process for removing the lubricating layer is implemented. As a result of this, a good magnetic recording medium can be formed.

According to the manufacturing method of the magnetic recording medium of the embodiment of the present invention, after the magnetic recording medium scanning process by the magnetic head, the lubricant adhered to the magnetic head is transferred to the substrate for measuring and the amount or distribution of the lubricant transferred to the substrate for measuring is measured. Therefore, it is possible to easily and reliably detect the lubricant adhered to the magnetic head. Because of this, it is possible to inspect the magnetic recording medium easily and accurately so that a high quality magnetic recording medium can be manufactured.

The inspection step of the embodiment of the present invention can be applied as an evaluation method of the magnetic recording medium. In other words, the inspection step (S104) shown in FIG. 1 can be applied to evaluation of the lubricant material or a protection film material or the evaluation of the manufacturing conditions of the magnetic recording medium. Since detailed contents of the evaluation method are discussed above, its explanation is omitted here. By this evaluation method, it is possible to detect the lubricant adhered to the magnetic head easily and reliably. Because of this, it is possible to evaluate the magnetic recording medium easily and accurately.

Next, examples of the embodiment of the present invention are discussed.

In the first example, a time for standing and adhering to the substrate for measuring of the medium facing surface of the magnetic head in the transferring process (S104-2) shown in FIG. 1 is studied.

Figure 5A:
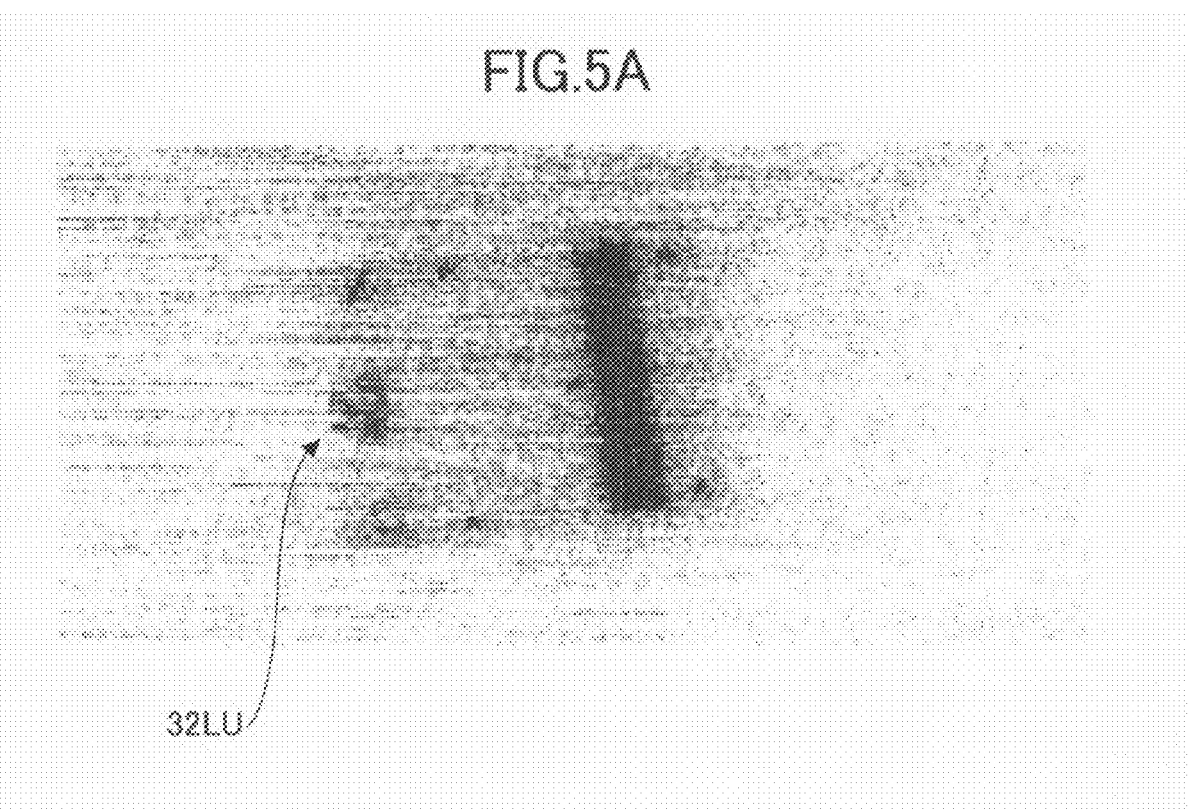
FIG. 5A is a view showing distribution of the lubricant on the substrate for measuring, where a transferring process (30 minutes for standing) of a first example is applied.
Figure 5B:
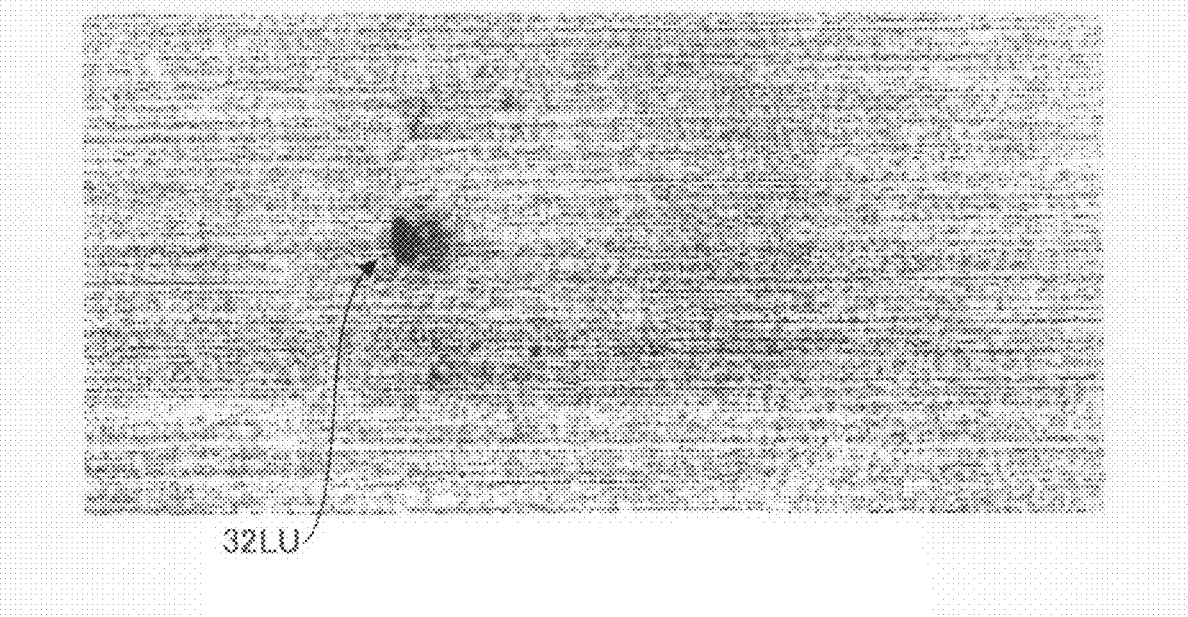
FIG. 5B is a view showing distribution of the lubricant on another substrate for measuring, where a transferring process (30 minutes for standing) is applied after the process shown in FIG. 5A.

FIG. 5A is a view showing distribution of the lubricant on the substrate for measuring, where a transferring process (30 minutes for standing) of a first example is applied. FIG. 5B is a view showing distribution of the lubricant on another substrate for measuring, where a transferring process (30 minutes for standing) is applied after the process shown in FIG. 5A. The arrangement where the magnetic head is adhered to the substrate for measuring in the example of FIG. 5A and FIG. 5B is the same as the example shown in FIG. 4C.

In any cases of the transferring process (30 minutes for first standing) shown in FIG. 5A and the transferring process (30 minutes for further standing) shown in FIG. 5B, the adhesion of the lubricant on the substrate for measuring, especially adhesion of the lubricant at the rear center rail 32LU, is found. Thus, it is found that, for 30 minutes of standing, the entire amount of the lubricant adhered to the medium facing surface of the magnetic head is not transferred to the substrate for measuring.

Figure 6A:
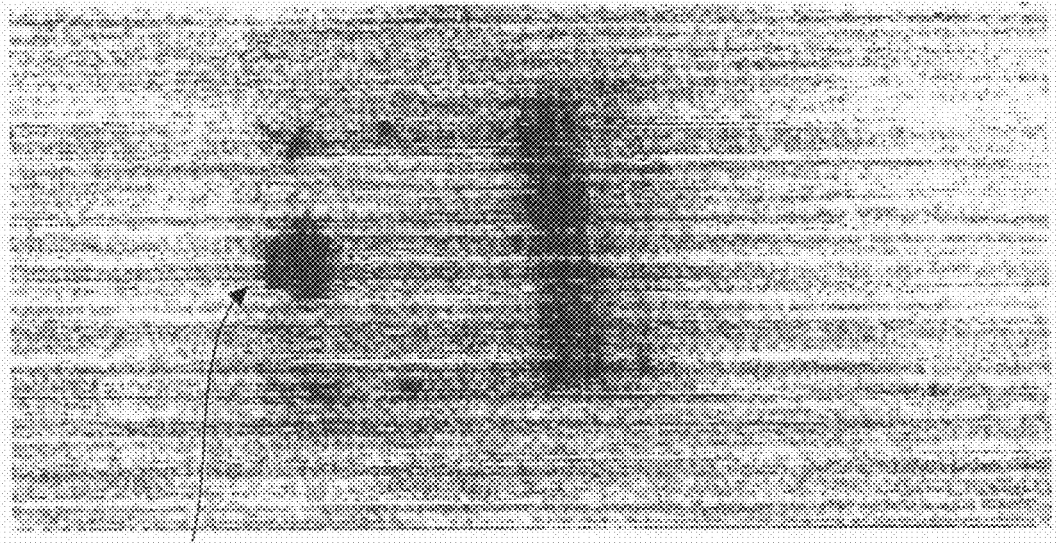
FIG. 6A is a view showing distribution of the lubricant on the substrate for measuring, where a transferring process (60 minutes for standing) of a first example is applied.
Figure 6B:
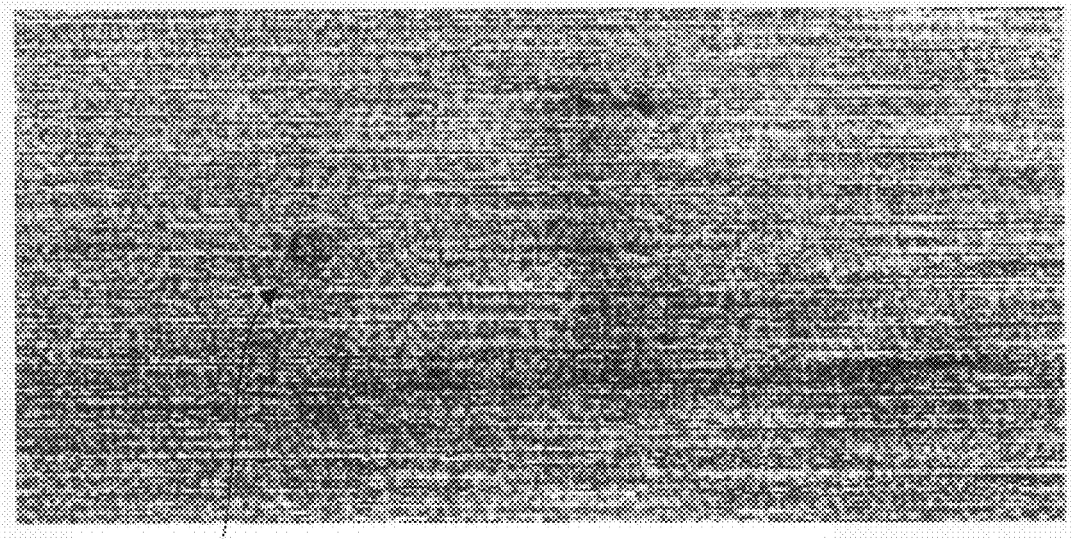
FIG. 6B is a view showing distribution of the lubricant on another substrate for measuring, where a transferring process (30 minutes for standing) is applied after the process shown in FIG. 6A.

FIG. 6A is a view showing distribution of the lubricant on the substrate for measuring, where a transferring process (60 minutes for standing) of a first example is applied. FIG. 6B is a view showing distribution of the lubricant on another substrate for measuring, where a transferring process (30 minutes for standing) is applied after the process shown in FIG. 6A. Directions in which the magnetic head is adhered to the substrate for measuring in FIG. 6A and FIG. 6B are the same as the direction in FIG. 4C.

There is transferring of the lubricant on the substrate for measuring by the transferring process (30 minutes for first standing) shown in FIG. 6A). However, in the transferring process (30 minutes for further standing) shown in FIG. 5B, the amount of adhesion of the lubricant at the rear center rail 32LU is minor. Because of this, it is found that, by setting the standing time to 60 minutes, it is possible to transfer the substantially entire amount of the lubricant adhered to the medium facing surface of the magnetic head to the substrate for measuring.

Therefore, in the transferring process (S104-2) shown in FIG. 1, it is possible to transfer the substantially entire amount of the lubricant to the substrate for measuring by setting the standing time to 60 minutes or more. By setting the standing time, it is possible to accurately obtain the amount of the lubricant transferred to the magnetic head.

Measuring of FIG. 5A through FIG. 6B is done by using "OSA6100" manufactured by Candela (United States of America). In addition, the film thickness of the lubricating layer of the magnetic recording medium is 1 nm. These conditions are applied to a second example discussed below.

FIG. 7A is a view showing distribution of the lubricant amount on the substrate for measuring, where a transferring process of a second example is applied. FIG. 7B is a graph showing distribution of the lubricant amount at line A-A in FIG. 7A. The direction in which the magnetic head is adhered to the substrate for measuring in FIG. 7A is the same as the direction in FIG. 4C.

Referring to FIG. 7A and FIG. 7B, there is transferring of the lubricant at parts corresponding to the rear center rail 32LU and the rear side rail 33LU. It is also found that the maximum lubricant thickness is 3 nm. Thus, it is possible to accurately measure the amount (thickness) and distribution of the lubricant.

Thus, according to the embodiments of the present invention, it is possible to provide a manufacturing method of a magnetic recording medium having a surface where a lubricating layer is provided, the manufacturing method including the steps of applying a lubricant so that the lubricating layer is formed; and inspecting the magnetic recording medium where the lubricating layer is formed; wherein the step of inspecting includes a first step of floating a magnetic head over the magnetic recording medium or sliding the magnetic head on a surface of the magnetic recording medium; a second step of adhering a medium facing surface of the magnetic head to a surface of a substrate for measuring, standing the medium facing surface of the magnetic head on the surface of the substrate for measuring, and transferring the lubricant from the medium facing surface of the magnetic head to the substrate for measuring; a third step of measuring an amount of the lubricant on the surface of the substrate for measuring; and a fourth step of determining whether the amount of the lubricant is proper.

Since the magnetic head is floated over the magnetic recording medium or the magnetic head is slid on the surface of the magnetic recording medium, and then the medium facing surface of the magnetic head is adhered to a surface of the substrate for measuring, the medium facing surface of the magnetic head stands, and the lubricant is transferred from the medium facing surface of the magnetic head to the substrate for measuring, so that the amount of the lubricant on the surface of the substrate for measuring is measured.

Therefore, it is possible to easily and reliably detect the lubricant adhered on the magnetic head. Because of this, it is possible to easily and accurately evaluate evenness of the film thickness of the magnetic recording medium using the magnetic head or fixing stability of the lubricating layer with the protection film. Therefore, it is possible to easily and reliably inspect the magnetic recording medium so that a high quality magnetic recording medium can be manufactured.

According to the embodiments of the present invention, it is possible to provide an evaluating method of a magnetic recording medium, including the step of: a first step of floating a magnetic head over the magnetic recording medium having a surface where a lubricating layer is formed or sliding the magnetic head on the surface of the magnetic recording medium; a second step of contacting a medium facing surface of the magnetic head to a surface of a substrate for measuring, standing the medium facing surface of the magnetic head on the surface of the substrate for measuring, and transferring a lubricant from the medium facing surface of the magnetic head to the substrate for measuring; a third step of measuring an amount of the lubricant on the surface of the substrate for measuring; and a fourth step of determining whether the amount of the lubricant is proper.

Thus, the amount or distribution of the lubricant transferred on the substrate for measuring is measured the same way as the inspection step of the above-mentioned manufacturing method. Therefore, it is possible to easily and reliably detect the lubricant adhered on the magnetic head. Because of this, it is possible to easily and accurately evaluate evenness of the film thickness of the magnetic recording medium using the magnetic head or fixing stability of the lubricating layer with the protection film. Therefore, it is possible to easily and reliably inspect the magnetic recording medium.

The present invention is not limited to these embodiments, but variations and modifications may be made without departing from the scope of the present invention.

This patent application is based on Japanese Priority Patent Application No. 2006-326176 filed on Dec. 1, 2006, the entire contents of which are hereby incorporated by reference.

What is claimed is:

1. A manufacturing method of a magnetic recording medium having a surface where a lubricating layer is provided, the manufacturing method comprising the steps of:
    applying a lubricant so that the lubricating layer is formed; and
    inspecting the magnetic recording medium where the lubricating layer is formed;
    wherein the step of inspecting includes
    a first step of floating a magnetic head over the magnetic recording medium or sliding the magnetic head on a surface of the magnetic recording medium;
    a second step of adhering a medium facing surface of the magnetic head to a surface of a substrate for measuring, standing the medium facing surface of the magnetic head on the surface of the substrate for measuring, and transferring the lubricant from the medium facing surface of the magnetic head to the substrate for measuring;
    a third step of measuring an amount of the lubricant on the surface of the substrate for measuring; and
    a fourth step of determining whether the amount of the lubricant is proper.

2. The manufacturing method of the magnetic recording medium as claimed in claim 1,
    wherein the substrate for measuring in the second step has a surface where a protection film made of carbon is provided, and
    the protection film is exposed.

3. The manufacturing method of the magnetic recording medium as claimed in claim 2,
    wherein the surface of the protection film is nitrided.

4. The manufacturing method of the magnetic recording medium as claimed in claim 3,
    wherein the amount of nitrogen of the surface of the protection film is equal to or greater than 10 at % and equal to or smaller than 15 at %.

5. The manufacturing method of the magnetic recording medium as claimed in claim 1,
    wherein, in the second step, transferring is performed at a temperature equal to or greater than 20° C. and equal to or less than 30° C.

6. The manufacturing method of the magnetic recording medium as claimed in claim 1,
    wherein, in the second step, standing is performed for 60 minutes or more.

7. The manufacturing method of the magnetic recording medium as claimed in claim 1,
    wherein, in the third step, the amount of the lubricant is measured by an X-ray electron spectroscopy method, a Fourier transform infrared spectroscopy method, or an ellipsometry method.

8. The manufacturing method of the magnetic recording medium as claimed in claim 1,
    wherein, in the third step, distribution of the amount of the lubricant is measured with relation to the position of the medium facing surface.

9. An evaluating method of a magnetic recording medium, comprising the step of:
    a first step of floating a magnetic head over the magnetic recording medium having a surface where a lubricating layer is formed or sliding the magnetic head on the surface of the magnetic recording medium;
    a second step of contacting a medium facing surface of the magnetic head to a surface of a substrate for measuring, standing the medium facing surface of the magnetic head on the surface of the substrate for measuring, and transferring a lubricant from the medium facing surface of the magnetic head to the substrate for measuring;
    a third step of measuring an amount of the lubricant on the surface of the substrate for measuring; and
    a fourth step of determining whether the amount of the lubricant is proper.

* * * * *